(12) United States Patent
Dolezan et al.

(10) Patent No.: US 11,852,355 B2
(45) Date of Patent: Dec. 26, 2023

(54) USER INTERFACE DISPLAY FOR COOKING APPLIANCE

(71) Applicant: WHIRLPOOL CORPORATION, Benton Harbor, MI (US)

(72) Inventors: Kevin Dolezan, Stevensville, MI (US); Vinod Jadhav, Maharashtra (IN); Shekhar D. Jirafe, Stevensville, MI (US); Tyler Douglas Mathews, Niles, MI (US); Fernando A. Ribas Junior, Joinville (BR); Rahul Wadke, St. Joseph, MI (US); James R. Chisholm, Libertyville, IL (US); Randell L. Jeffery, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/117,673

(22) Filed: Mar. 6, 2023

(65) Prior Publication Data

US 2023/0221004 A1    Jul. 13, 2023

Related U.S. Application Data

(63) Continuation of application No. 17/313,458, filed on May 6, 2021, now Pat. No. 11,619,393.

(51) Int. Cl.
| | |
|---|---|
| *F24C 15/00* | (2006.01) |
| *F24C 15/04* | (2006.01) |
| *F24C 7/08* | (2006.01) |
| *G06F 3/041* | (2006.01) |
| *G06F 3/0488* | (2022.01) |

(52) U.S. Cl.
CPC .............. *F24C 7/083* (2013.01); *G06F 3/041* (2013.01); *G06F 3/0488* (2013.01)

(58) Field of Classification Search
None
See application file for complete search history.

(56) References Cited

U.S. PATENT DOCUMENTS

| | | |
|---|---|---|
| 6,493,440 B2 | 12/2002 | Gromatzky et al. |
| 8,854,595 B2 | 10/2014 | Dunn |

(Continued)

FOREIGN PATENT DOCUMENTS

| | | |
|---|---|---|
| CN | 107253826 A | 10/2017 |
| CN | 208058965 U | 11/2018 |

(Continued)

*Primary Examiner* — Carl Adams
(74) *Attorney, Agent, or Firm* — Price Heneveld LLP

(57) ABSTRACT

A cooking appliance includes a heating surface and an interface console elevated above the heating surface. The interface console includes a viewing window forming an outer surface and an inner surface, opposite the outer surface, and a display device configured to transmit light through the viewing window. The display device is aligned with the viewing window in a spaced-apart configuration forming an insulating passage between the display device and the interior surface. An air intake is in connection with the insulating passage. The insulating passage provides an air flow path extending from a ventilation passage of the cooking appliance, and the ventilation passage extends away from the heating surface and communicates environmental air to the insulating passage.

20 Claims, 11 Drawing Sheets

(56) References Cited

U.S. PATENT DOCUMENTS

| | | | |
|---|---|---|---|
| 8,879,042 B2 | 11/2014 | Dunn | |
| 9,528,696 B2 | 12/2016 | Bach et al. | |
| 9,696,404 B1 | 7/2017 | Doyle et al. | |
| 10,393,388 B2 | 8/2019 | Huntscha et al. | |
| 10,455,933 B2 | 10/2019 | Debreyer et al. | |
| 2009/0032010 A1* | 2/2009 | Hoffmeier | F24C 15/04 |
| | | | 361/837 |
| 2009/0107479 A1 | 4/2009 | Armstrong et al. | |
| 2010/0193494 A1 | 8/2010 | Prunchak et al. | |
| 2011/0209626 A1* | 9/2011 | Underwood | H05B 6/6414 |
| | | | 99/357 |
| 2016/0179235 A1 | 6/2016 | Winkelmann et al. | |
| 2016/0212801 A1* | 7/2016 | Nishijima | H05B 6/642 |
| 2016/0348918 A1* | 12/2016 | Bhogal | F24C 15/04 |
| 2017/0150651 A1* | 5/2017 | Hartman | B32B 15/09 |
| 2021/0207812 A1* | 7/2021 | Bhogal | F24C 7/086 |

FOREIGN PATENT DOCUMENTS

| | | |
|---|---|---|
| CN | 109375831 A | 2/2019 |
| DE | 102009045665 A1 | 4/2011 |
| EP | 1283105 A1 | 2/2003 |
| EP | 1467229 A2 | 10/2004 |
| JP | 4945696 B2 | 6/2012 |
| KR | 20080088342 A | 10/2008 |
| KR | 101930065 B1 | 12/2018 |

\* cited by examiner

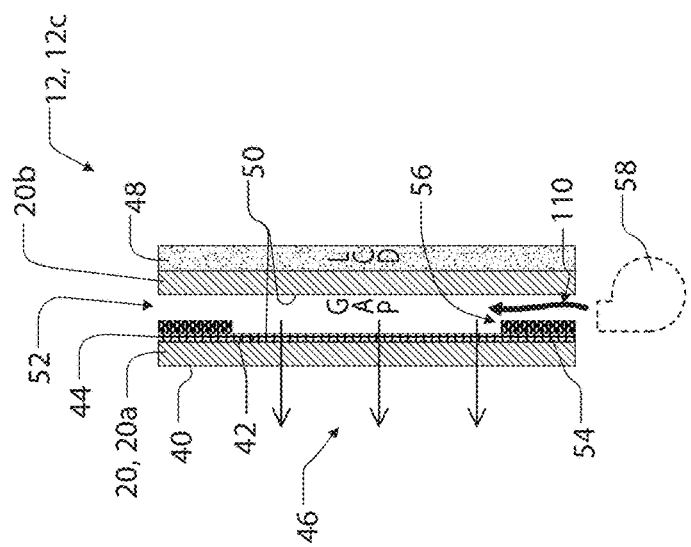
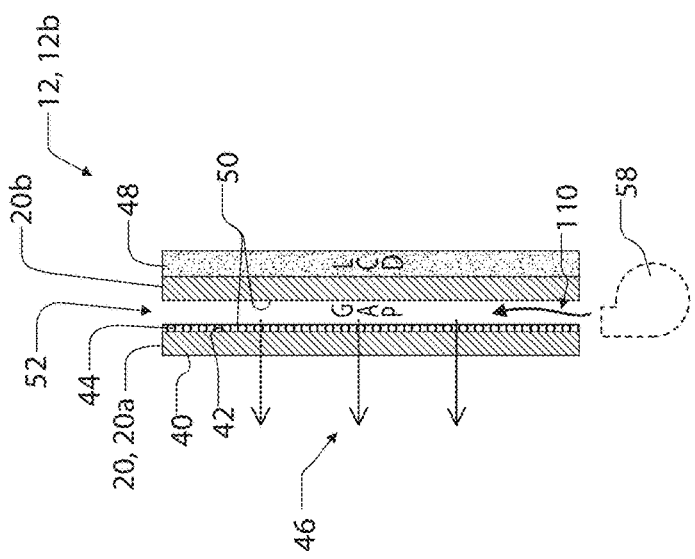
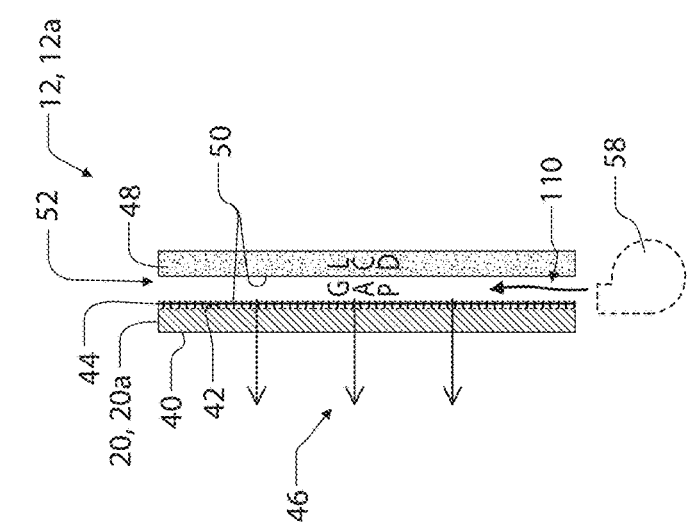

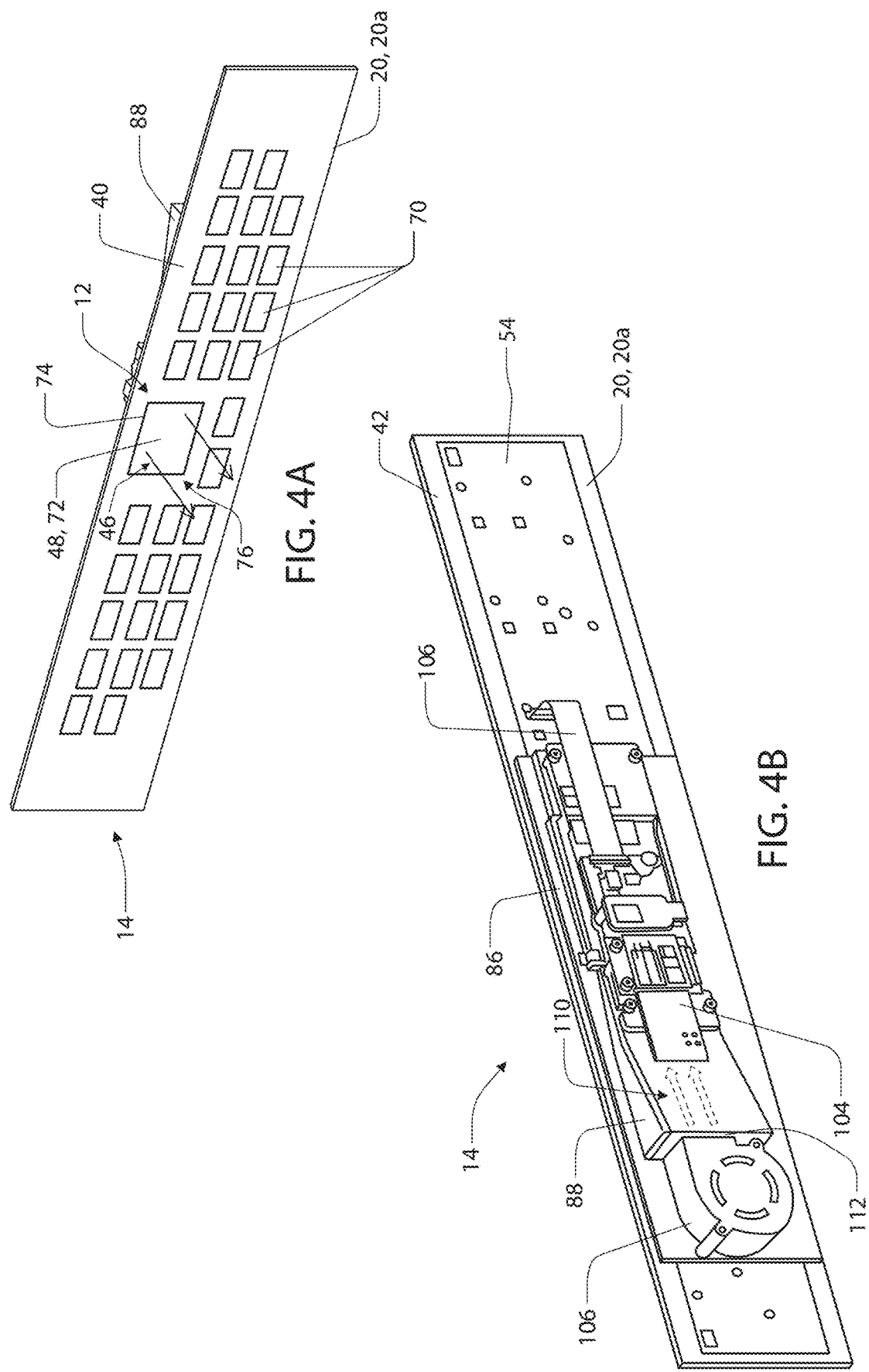

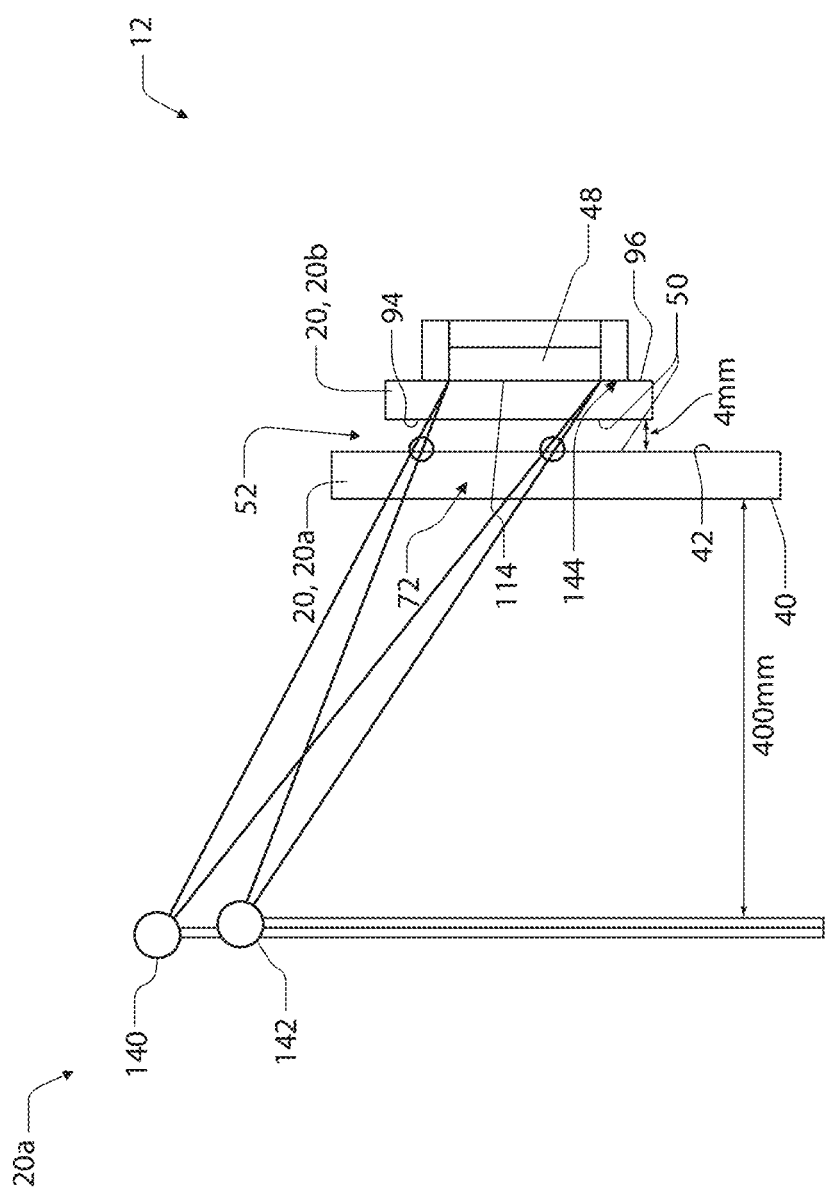

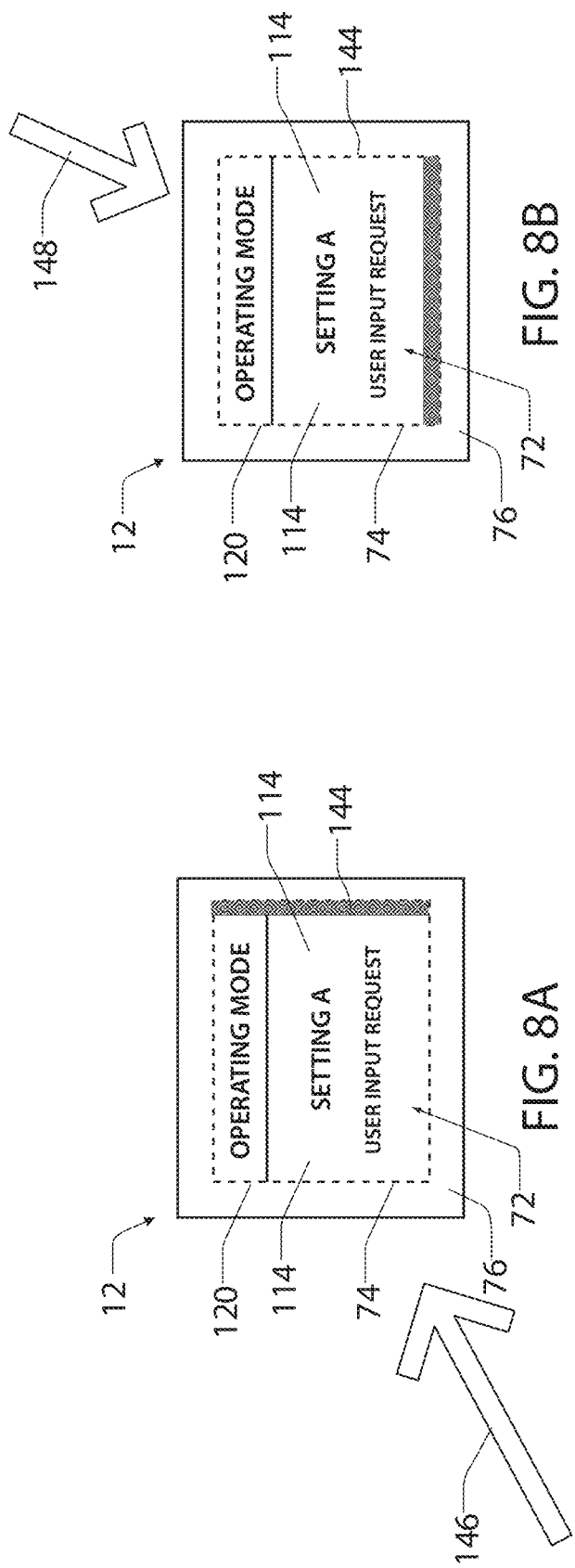
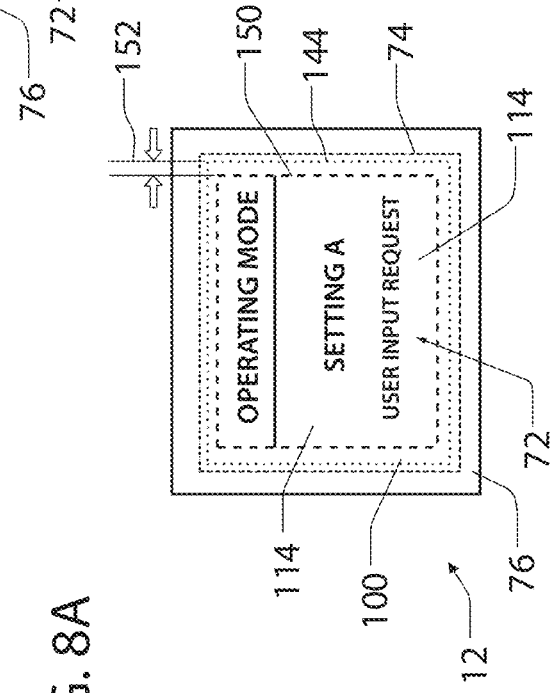
FIG. 8A
FIG. 8B
FIG. 8C

USER INTERFACE DISPLAY FOR COOKING APPLIANCE

CROSS-REFERENCE TO RELATED APPLICATIONS

This application is a continuation of U.S. application Ser. No. 17/313,458 entitled USER INTERFACE DISPLAY FOR COOKING APPLIANCE, filed on May 6, 2021, by Kevin Dolezan et al., now U.S. Pat. No. 11,619,393, the entire disclosure of which is incorporated herein by reference.

BACKGROUND OF THE DISCLOSURE

The present disclosure generally relates to a display for a user interface of a cooking appliance, and more specifically, to an insulated display device configured for exposure to a heat source of a cooking appliance.

SUMMARY OF THE DISCLOSURE

According to one aspect of the present disclosure, a cooking appliance includes a heating surface and an interface console elevated above the heating surface. The interface console includes a viewing window forming an outer surface and an inner surface, opposite the outer surface and a display device configured to transmit light through the viewing window. The display device is aligned with the viewing window in a spaced-apart configuration forming an insulating passage between the display device and the interior surface. An air intake is in connection with the insulating passage. The insulating passage provides an air flow path extending from a ventilation passage of the cooking appliance and the ventilation passage extends away from the heating surface and communicates environmental air to the insulating passage.

According to another aspect of the present disclosure, a cooking appliance comprises a heating source positioned below a heating surface. The cooking appliance includes a console proximate to the heating surface that receives heat energy generated by the heating source. The console includes a viewing window forming an outer window surface and an inner window surface and a display screen aligned with and spaced away from the viewing window forming a cavity therebetween. The display screen comprises an inner display surface and an outer display surface. An air intake is in fluid communication with the cavity. The cavity provides an air flow path extending from a ventilation passage of the cooking appliance that extends away from the heating surface and communicates environmental air to the cavity.

According to yet another aspect of the present disclosure, a cooking appliance includes a heating surface extending over a heat generating unit and an interface console proximate the heating surface. The interface console includes a viewing window forming an outer surface and an inner surface, opposite the outer surface. A display device is configured to transmit light through the viewing window. The display device is aligned with the viewing window in a spaced-apart configuration forming an interior passage between the display device and the inner surface. An air intake is in connection with the interior passage. The interior passage provides an air flow path extending from a ventilation passage of the cooking appliance. An air displacement device is in fluid communication with the ventilation passage. The air displacement device generates an air flow of environmental air through the air intake and the interior passage.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 3A is a simplified cross-sectional view of a display apparatus for a cooking appliance;

FIG. 3B is a simplified cross-sectional view of a display apparatus for a cooking appliance;

FIG. 3C is a simplified cross-sectional view of a display apparatus for a cooking appliance;

FIG. 4A is a projected front assembly view of an interface console of a cooking appliance;

FIG. 4B is a projected rear assembly view of an interface console of a cooking appliance;

FIG. 7 is a schematic diagram demonstrating a user height perspective of a display device resulting in a visual parallax;

FIG. 8A is a representative diagram of a side perspective parallax;

FIG. 8B is a representative diagram of a top perspective parallax;

FIG. 8C is a representative diagram of a perimeter mask incorporated on a substrate of the display apparatus that conceals the parallax issues associated with FIGS. 8A and 8B;

Figure 1:
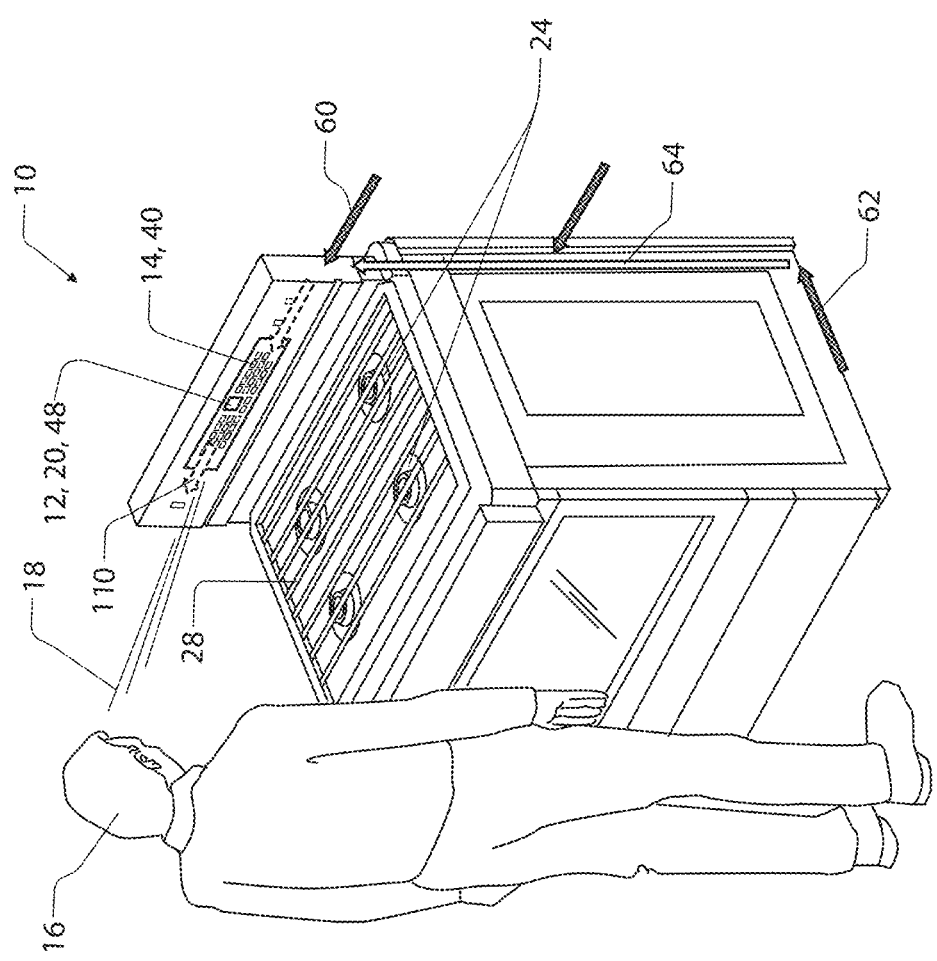
FIG. 1 is a projected view of a user interacting with a cooking appliance that includes an elevated interface console.

The components in the figures are not necessarily to scale, emphasis instead being placed upon illustrating the principles described herein.

DETAILED DESCRIPTION

The present illustrated embodiments reside primarily in combinations of method steps and apparatus components related to a display apparatus for a cooking appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
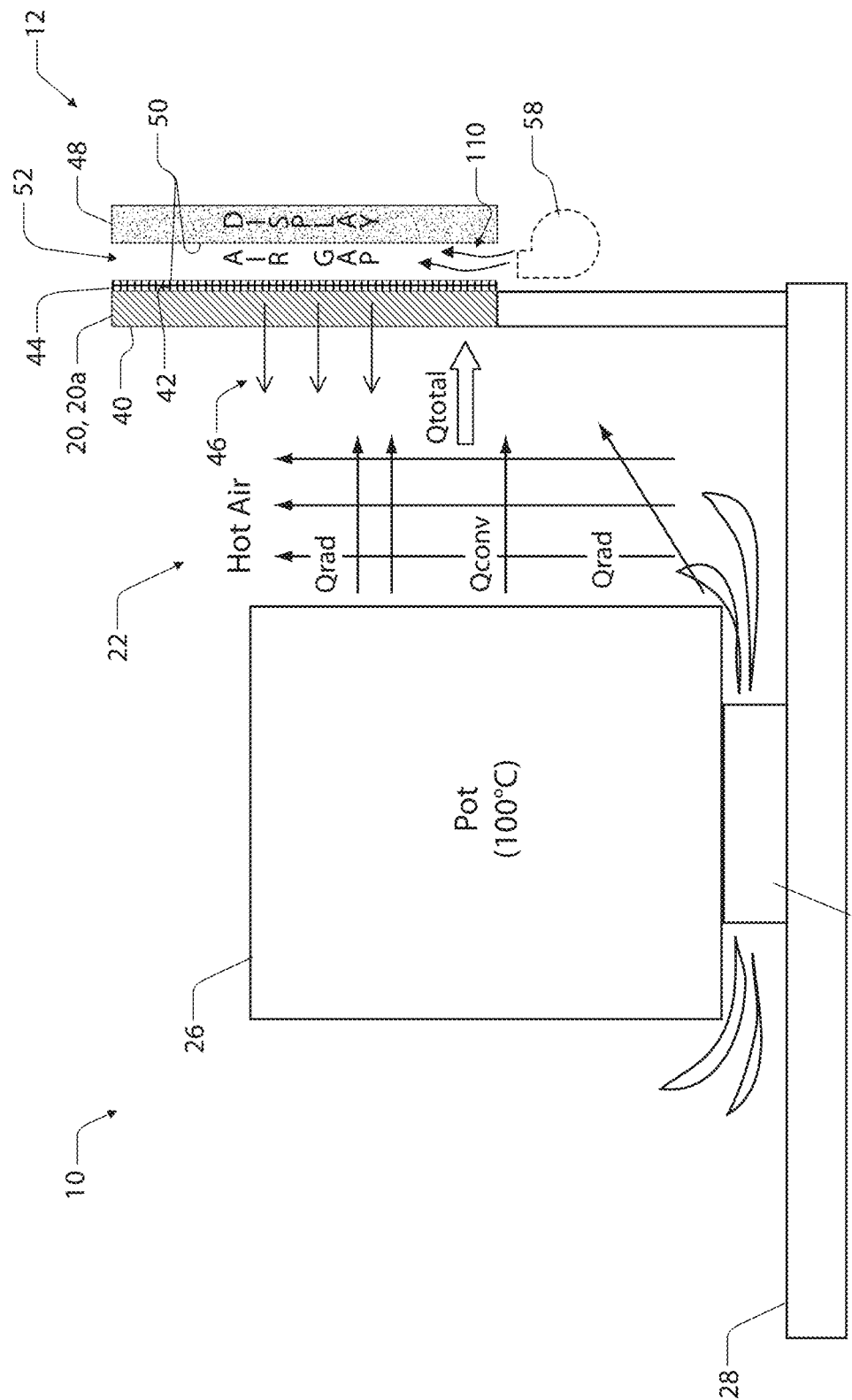
FIG. 2 is a simplified schematic view of a cooking surface of a cooking appliance demonstrating heat transmission from a heat source and a cooking implement to an interface console of the cooking appliance.

Referring to FIGS. 1-3, reference numeral 10 generally designates a cooking appliance that includes a display apparatus 12 incorporated in an interface console 14. The cooking appliance 10 is demonstrated in the form of a freestanding range but may similarly correspond to an oven, stove, cooktop, or other cooking appliances that may incorporate displays exposed to elevated temperatures. As demonstrated in FIG. 1, a user 16 is shown viewing the display apparatus 12 from an elevated viewing perspective 18. The elevated viewing perspective 18 results in a misaligned view of the display apparatus 12 through one or more substrates 20 through which the display apparatus 12 is viewed by the user 16. In various implementations, the one or more substrates 20 may serve to insulate and/or protect the display apparatus 12 from heat energy 22 that may be transferred from heat sources 24 and cooking implements 26 (e.g., pot in FIG. 2) operated on a surface 28 of the cooking appliance 10. As discussed in detail in the following description, the disclosure provides for a variety of solutions to insulate and protect the display apparatus 12 from the heat energy 22 and also provides for solutions to limit visual inconsistencies that may result from the insulating solutions for the display apparatus 12.

As discussed herein, the heat sources 24 may correspond to induction hobs, gas hobs or burners, electric elements, etc. utilized to heat various forms of the cooking implements 26. Cooking implements 26 may correspond to pots, pans, or various forms of utensils that may be heated by the heat sources 24. As demonstrated in FIG. 2, the heat energy 22 output from the heat sources 24 may partially be absorbed by the cooking implements 26. Additionally, the heat energy 22 in the form of radiant energy and convective heat energy may be transferred from the heat sources 24 and the cooking implements 26 to the interface console 14. As shown, the interface console 14 is elevated above the surface 28, which may provide for improved viewing by the user 16 from the elevated viewing perspective 18. However, the elevated position of the interface console 14 and the display apparatus 12 relative to the surface 28 also results in increased receipt of the heat energy 22 transmitted from the heat sources 24 and the cooking implements 26. As a result of the heat energy 22 absorbed by the interface console 14, elevated temperatures can result in the display apparatus 12 and corresponding electronics, which may be damaged if not insulated.

Referring now to FIGS. 2, 3A, 3B, and 3C, various implementations of the display apparatus 12 are shown demonstrating insulating and/or cooling solutions for the interface console 14. Examples of alternative solutions for thermal control of the display apparatus 12 are shown in FIGS. 3A, 3B, and 3C. Though the solutions are identified as a first display apparatus 12a, a second display apparatus 12b, and a third display apparatus 12c, it shall be understood that the components and contributing elements of each of the apparatuses 12 may be interchangeably implemented in the cooking appliance 10 without departing from the spirit of the disclosure. Accordingly, the differing examples of the display apparatuses 12 are merely provided as alternatives that may be implemented to suit the needs of specific applications of the interface console 14.

As depicted in FIGS. 2 and 3A, the first display apparatus 12a includes a first substrate 20a that forms an interface surface 40 of the interface console 14. Opposite the interface surface 40, the first substrate 20a forms an interior surface 42 that may include a low thermal emissivity (low-E) coating 44. The low-E coating 44 may be deposited on the interior surface 42 of the first substrate 20a by a pyrolytic chemical vapor deposition or magnetron sputtering that may limit the emissivity of the heat energy 22 through the first substrate 20a while allowing light 46 from a display device 48 of the display apparatus 12 to pass outward through the first substrate 20a. The display device 48 may be implemented by various forms of display technology including light emitting diode (LED) displays, liquid crystal displays (LCD), etc. Accordingly, the low-E coating 44 incorporated on the first substrate 20a may limit the thermal absorption of the display apparatus 12. Though depicted in many of the described examples, the low-E coating 44 may be included as an optional element of each of the assemblies. More generally, the each of the elements discussed in the application may be optionally utilized unless expressly stated otherwise.

Referring now to FIGS. 3A, 3B, and 3C, each of the display apparatuses 12 include an insulating passage 50 formed between the first substrate 20a and the display device 48. The insulating passage 50 provides for an interior cavity 52 or air gap, which allows insulating air to pass between the first substrate 20a and the display device 48. As shown in FIGS. 3B and 3C, a second substrate 20b may be interposed between the interior cavity 52 and the display device 48, such that the insulating passage 50 is formed between the first substrate 20a and the second substrate 20b. In each of these configurations, the insulating passage 50 may further limit heat transfer of the heat energy 22 from reaching the display device 48 and corresponding electronic circuitry. As shown in FIG. 3C, the display apparatus 12 may include a touch panel 54 disposed between the interior surface 42 of the first substrate 20a and the interior cavity 52. In order to effectively transmit the display light 46 from the display device 48, a cutout or opening 56 may be formed through the touch panel 54. The touch panel 54 may correspond to an array of capacitive or resistive touch switches distributed over a printed circuit board, which may be adhered to the first substrate 20a as further discussed in reference to FIG. 4C.

As demonstrated in each of FIGS. 3A, 3B, and 3C, the display apparatus 12 can further include an air displacement device 58 (e.g., a blower, fan, etc.) configured to deliver environmental air through the interior cavity 52 of the insulating passage 50. The environmental air is drawn from a source that is located away from the heat sources 24 and corresponding heat energy 22. As demonstrated in FIG. 1, the environmental air may be drawn from behind the cooking appliance 10, as demonstrated by arrow 60. The environmental air may also be drawn from below the cooking appliance 10, as demonstrated by arrow 62. In some cases, the environmental air may simply be drawn from a region below the cooking surface 28. As shown, the arrows 60, 62 may represent air supplied to one or more ventilation passages 64 through which the environmental air may be transferred to the interior cavity 52 by the air displacement device 58. In this way, the display apparatus 12 may be actively cooled or insulated by supplying fresh forced air through the insulating passage 50, such that the air in the interior cavity 52 does not increase in temperature due to the receipt of the heat energy 22 from the heat sources 24 and the cooking implements 26.

Figure 4C:
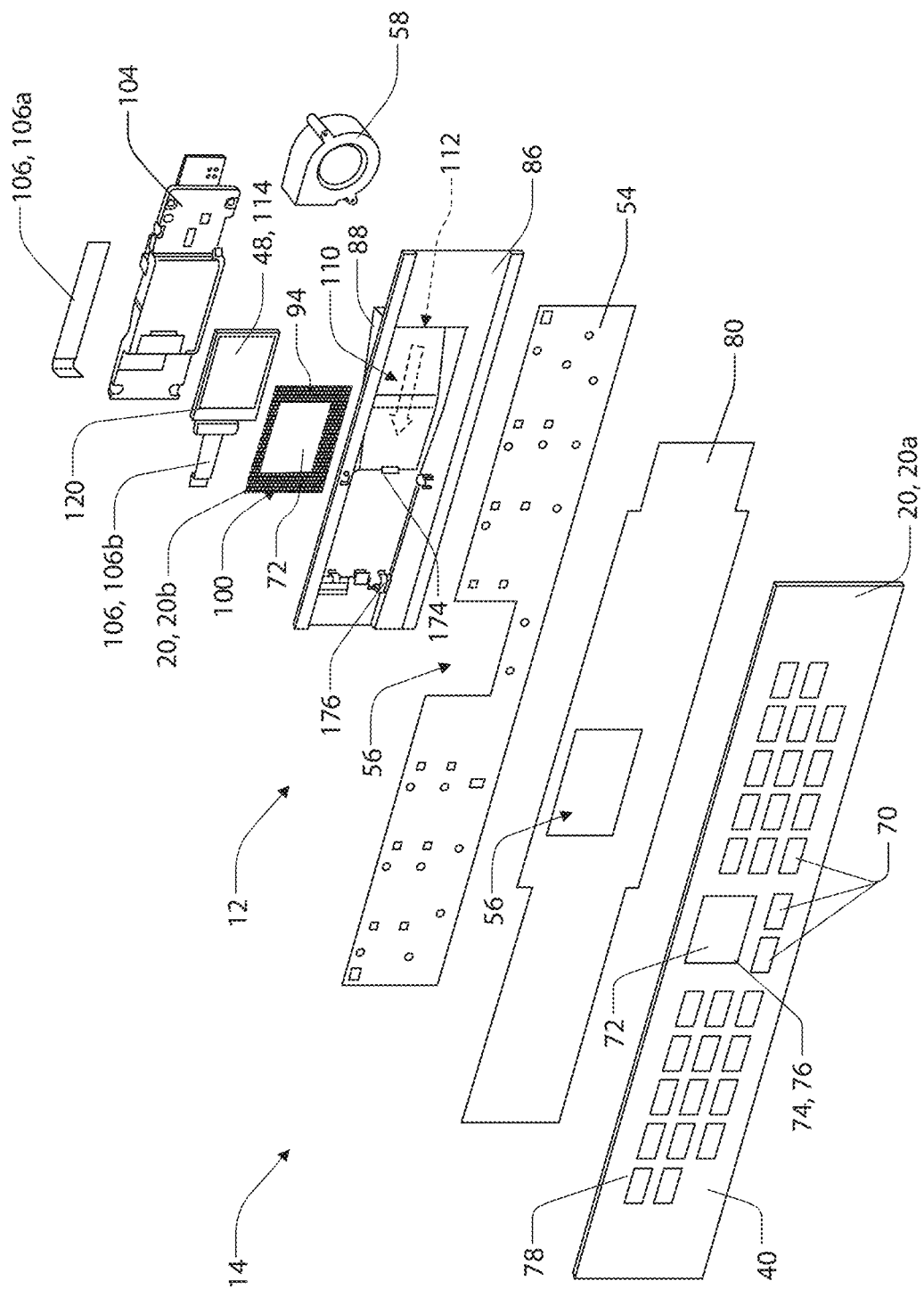
FIG. 4C is an exploded assembly view of an interface console of a cooking appliance.

Referring now to FIGS. 4A, 4B, and 4C, projected and exploded assembly views of the interface console 14 are shown. In various implementations, the interface console 14 includes user inputs 70 with locations on the interface surface 40 that correspond to touch sensors of the touch panel 54. As demonstrated in FIG. 4A, display light 46 emitted from the display device 48 is visible through a transparent window 72 that is enclosed about a viewing perimeter 74 by an opaque boundary 76. The opaque boundary 76 is formed by a decorative mask 78 incorporated on the first substrate 20a. As shown, the decorative mask 78 can include outlines defining the user inputs 70 and text identifying the corresponding functions. In operation, the display device 48 provides feedback and instructions to the user 16 in response to the user inputs 70.

As shown in FIGS. 4B and 4C, the touch panel 54 is connected to the interior surface 42 of the first substrate 20a by an adhesive layer 80. The first substrate 20a in connection with the touch panel 54 is connected to a housing 86 that further connects and aligns the display device 48 with the transparent window 72 and the cutout 56 formed in the touch panel 54. In various implementations, the second substrate 20b is interposed between the display device 48 and the housing 86. The housing 86 further positions the first substrate 20a in a spaced-apart configuration relative to the second substrate 20b and the display device 48. The housing 86 includes an air intake 88 in connection with an insulating passage 50 formed between the first substrate 20a and the second substrate 20b. The air intake 88 may further be connected to the air displacement device 58 that supplies a flow of fresh environmental air through an interior cavity 52 within the insulating passage 50 to limit heat transfer from the first substrate 20a to the second substrate 20b.

The second substrate 20b may provide a protective barrier between the interior cavity 52 and a display surface of the display device 48. As shown, a first surface 94 of the second substrate 20b is directed toward the interior cavity 52 and forms a wall of the insulating passage 50 and a second surface 96 of the second substrate 20b faces the display device 48. In some implementations, a perimeter mask 100 is incorporated on the second surface 96 of the second substrate 20b. As discussed later in reference to FIGS. 7, 8A, 8B, and 8C, the perimeter mask 100 may partially overlap the display surface of the display device 48, such that an elevated or misaligned viewing perspective 18, as previously discussed in reference to FIG. 1, does not result in a parallax error of the display device 48.

A control board 104 connects the display device 48 to the housing 86 and may include control and interface circuitry that interconnects the touch panel 54 to the display device 48 and further controls communication and operations of the cooking appliance 10. The communication between the control circuitry on the control board 104, the touch panel 54, and the display device 48 is provided by communication cables 106, which may communicate control signals and operating power from the control board 104 to the display device 48 and the touch panel 54. More specifically, the control board 104 is in communication with the touch panel 54 via a first communication cable 106a and is in communication with the display device 48 via a second communication cable 106b. The communication cables 106 may be implemented by a variety of conductive connectors and are shown in the examples as flexible flat cables, which may assist to limit an overall thickness of a combined assembly of the interface console 14.

Figure 5:
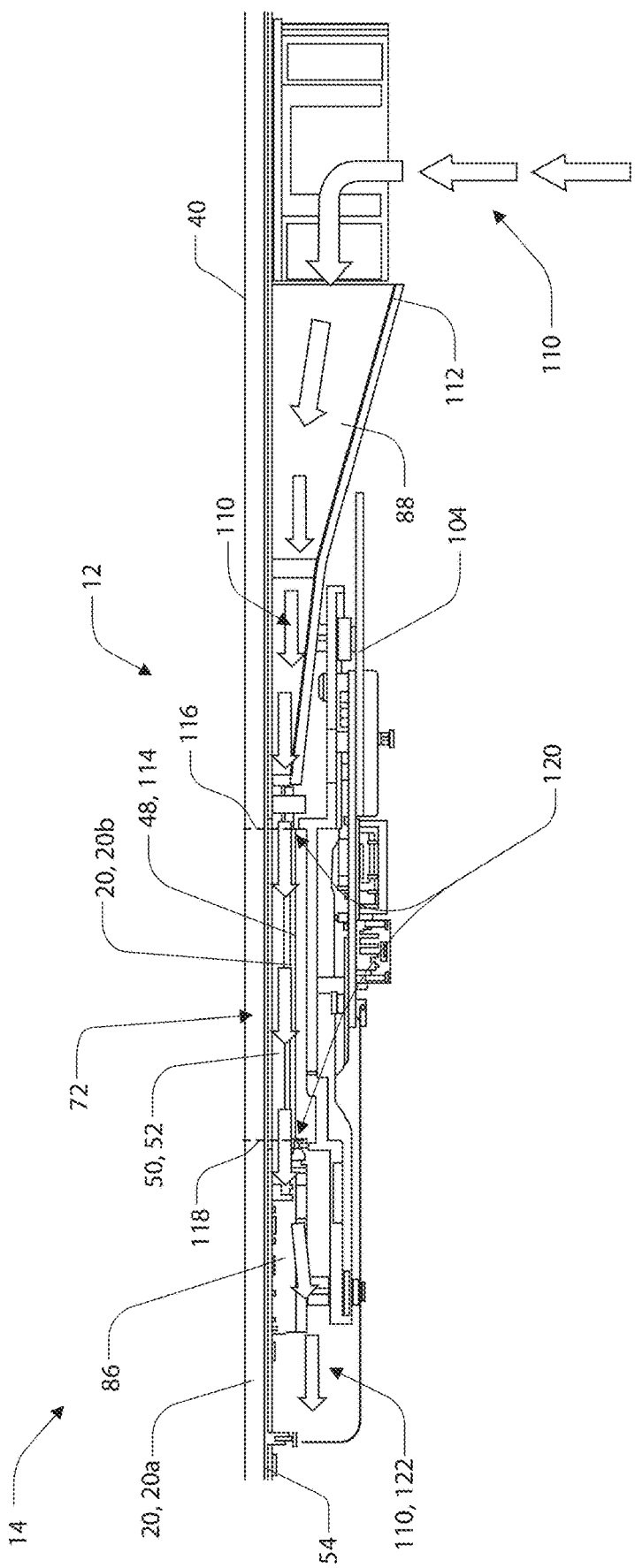
FIG. 5 is a top cross-sectional view demonstrating air flow through an interface console of a cooking appliance.

Referring now to FIG. 5, an air flow path 110 of the environmental air passes through the interior cavity 52 formed by the insulating passage 50. As depicted, a top cross-sectional view of the interface console 14 demonstrates the air displacement device 58 in connection with an inlet 112 of the air intake 88. The air flow path continues through the air intake 88 and into the interior cavity 52 of the insulating passage 50 formed between the interior surface 42 of the first substrate 20a and the first surface 94 of the second substrate 20b. The insulating passage 50 through which the fresh environmental air flow extends over a display surface 114 of the display device 48 from a first perimeter edge 116 to a second perimeter edge 118 of a display perimeter 120. The environmental air is then directed outward from the insulating passage 50 to an outlet vent 122 where the air is expelled back to the environment. In this configuration, the display apparatus 12 is incorporated in the interface console 14 while preventing heat energy 22 from the heat sources 24 of the cooking appliance 10 from causing the display device 48 and corresponding circuitry of the control board 104 from reaching elevated temperatures.

Figure 6:
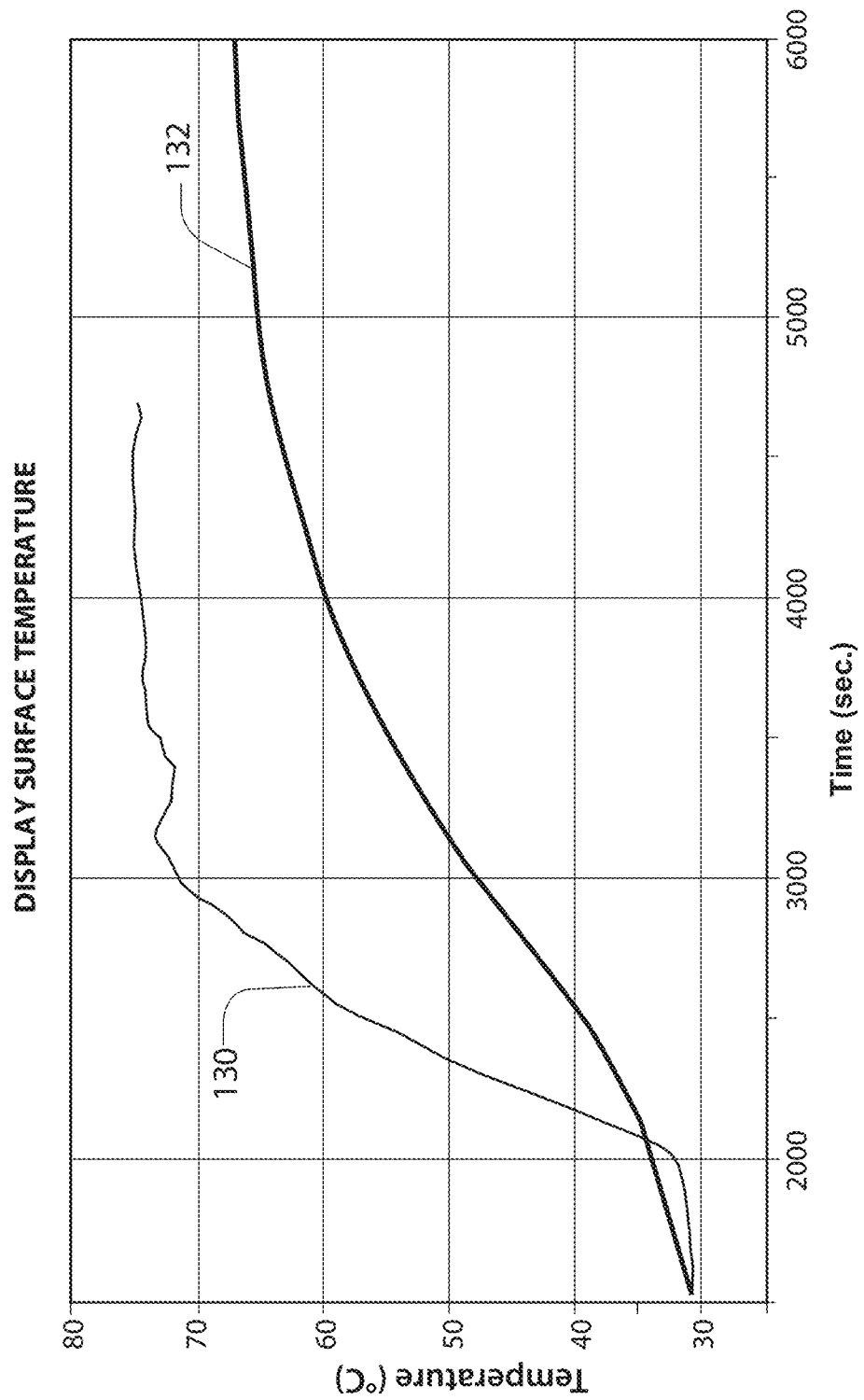
FIG. 6 is a plot of a temperature comparison of interface consoles for cooking appliances.

Referring to FIG. 6, temperature plots 130, 132 are shown demonstrating the temperature increases for display apparatuses 12 including a single substrate 20a compared to those incorporating the first substrate 20a and the second substrate 20b. More specifically, a first plot 130 demonstrates an increase in temperature in degrees Celsius over time in seconds for the display apparatus 12, including only a single substrate 20, and the second plot 132 demonstrates the temperature increase over time for the display apparatus 12, including the first substrate 20a and the second substrate 20b with the interior cavity 52 formed therebetween. The illustrated temperature increases were tested with the heat sources 24 of the cooking appliance 10 adjusted to a high setting with large cooking implements 26 (e.g., pots of boiling water) being heated and emitting the heat energy 22. In response to the heat energy, the display apparatus 12 with only a single substrate 20a increased in temperature more rapidly than the display apparatus 12 including the first substrate 20a and the second substrate 20b. That is, the first plot 130 demonstrates an increase in temperature measured at the display surface 114 of the display device 48 that increases at nearly twice the rate of the second plot 132. Additionally, the first plot 130 demonstrates a peak steady state temperature of approximately 85° C. while the second plot 132 demonstrates a peak steady state temperature of approximately 67° C. Accordingly, implementations of the display apparatus 12, including the first substrate 20a and the second substrate 20b with the interior cavity 52 formed therebetween, provide significant insulating benefits that ensure the display device 48 maintains lower operating temperatures.

Referring now to FIG. 7, a schematic diagram of the user 16 is shown demonstrating sources of the parallax error that result from the viewing perspective 18 previously introduced in FIG. 1. As shown, a male representative height 140 and a female representative height 142 are shown demonstrating viewing perspectives 18 of the display apparatus 12. The viewing perspectives 18 are shown viewing the display device 48 through the transparent window 72 formed within the decorative mask 78 on the first substrate 20a. The view of the user 16 continues across the interior cavity 52 formed by the insulating passage 50 between the first substrate 20a and the second substrate 20b. In the example shown, the interior cavity 52 is approximately 4 mm in width separating the interior surface 42 of the first substrate 20a from the first surface 94 of the second substrate 20b. In this configuration, the space formed by the insulating passage 50 between the first substrate 20a and the second substrate 20b causes a parallax issue that allows the user 16 to view an exposed perimeter 144 of the display surface 114 that is outside the display perimeter 120. Examples of the exposed perimeter 144 are further demonstrated in FIGS. 8A and 8B. In order to prevent the exposed perimeter 144 of the display device 48 from causing visual inconsistencies about the display perimeter 120, the perimeter mask 100 is included as a printed ceramic layer disposed on the second surface 96 of the second substrate 20b.

Referring now to FIGS. 8A, 8B, and 8C, examples of the exposed perimeter 144, depicted in FIGS. 8A and 8B, are shown compared to the display apparatus 12 incorporating the perimeter mask 100 in FIG. 8C. As shown in FIG. 8A, when viewing the display device 48 through the insulating passage 50 from a side originating viewing perspective 146, the exposed perimeter 144 becomes visible along an opposing side of the display perimeter 120. Similarly, when viewing the display device 48 from an elevated viewing perspective 148 (similar to the viewing perspective 18), the exposed perimeter 144 becomes visible along a bottom portion of the display perimeter 120. As shown in FIG. 8C, the exposed perimeter 144 resulting from the parallax error is concealed by the perimeter mask 100 disposed on the second surface 96 of the second substrate 20b. In order to ensure that the exposed perimeter 144 is not visible to the user 16, an interior boundary 150 of the perimeter mask 100 may overlap the display perimeter 120, creating an overlapping region 152 where the perimeter mask 100 blocks a portion of the display perimeter 120. Additionally, the viewing perimeter 74 of the transparent window 72 may extend outside the interior boundary 150 of the perimeter mask 100, such that a portion of the perimeter mask 100 is visible through the transparent window 72. In this configuration, with the color of the perimeter mask 100 formed to match the color of the decorative mask 78, the parallax issues and resulting exposed perimeter 144 are concealed and remediated.

Figure 9:
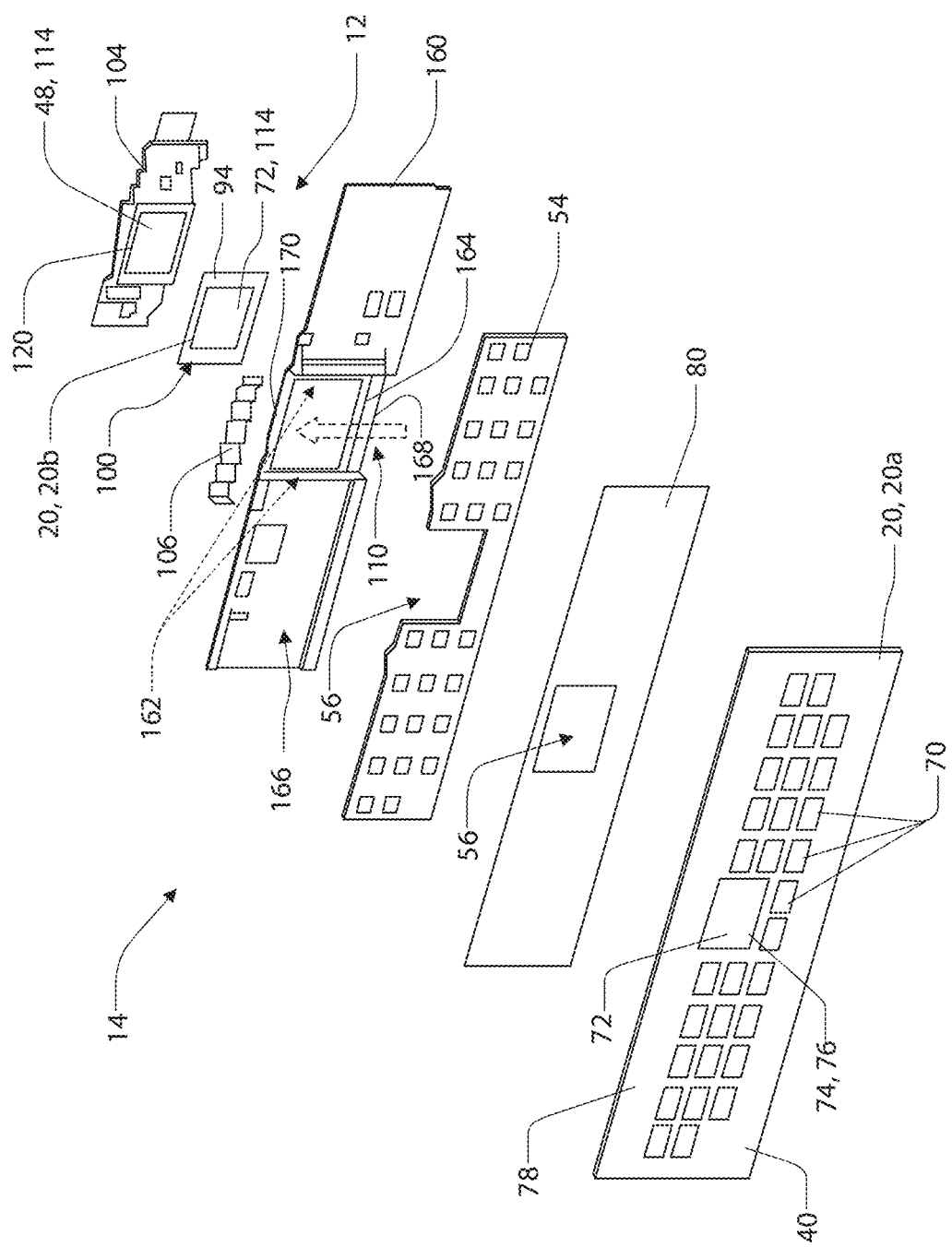
FIG. 9 is an exploded assembly view of an interface console demonstrating a perimeter mask for concealing a perspective parallax.
Figure 10:
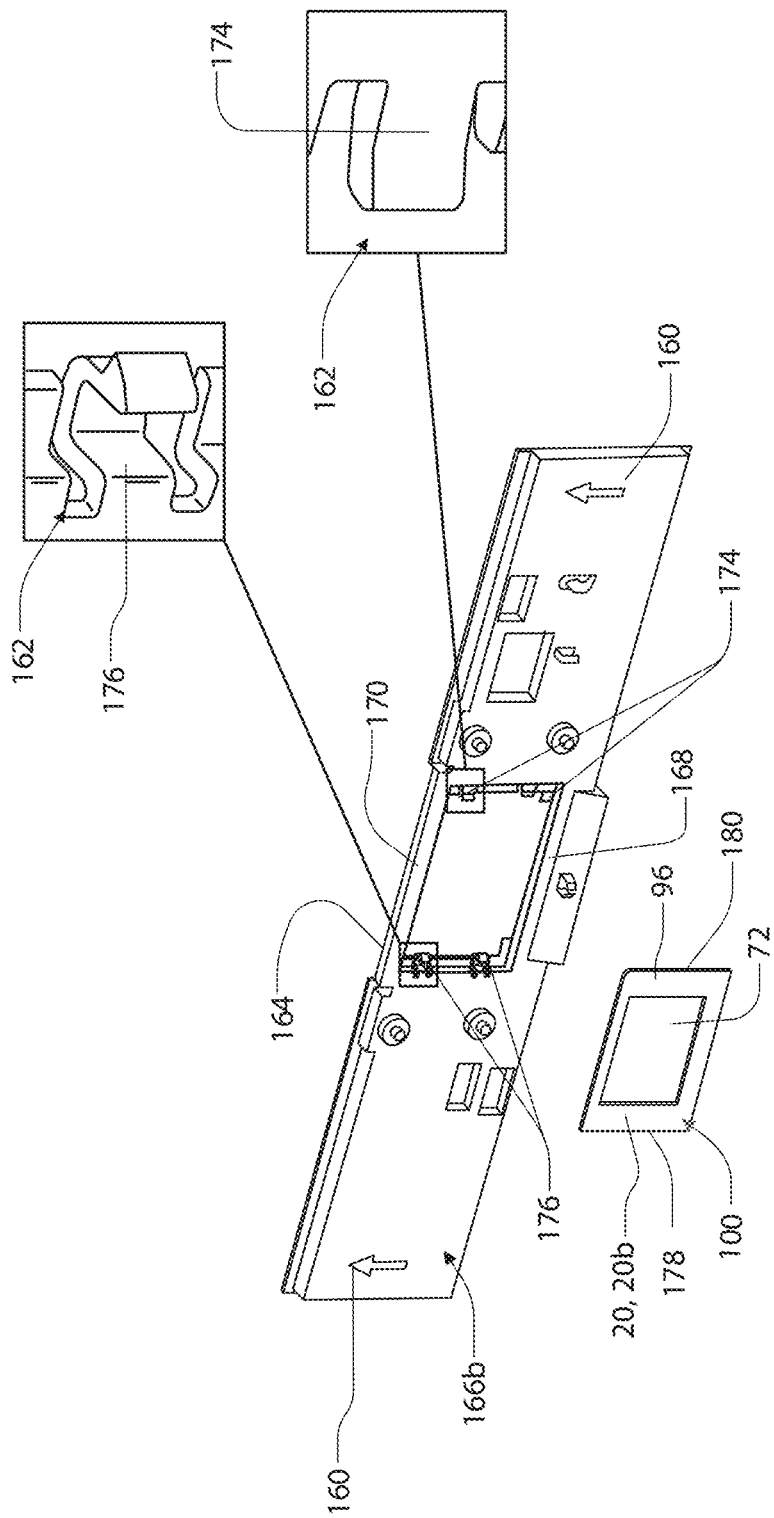
FIG. 10 is an exploded partial assembly view of the interface console of FIG. 9 demonstrating a housing configured to position a substrate comprising the perimeter mask in accordance with the disclosure.

Referring now to FIGS. 9 and 10, exploded assembly views of the interface console 14 and the assembly of the display apparatus 12 are shown demonstrating an attachment feature of the second substrate 20b and an alternate configuration of the housing 86. Various aspects of the interface console 14 demonstrated in FIGS. 9 and 10 are the same or similar to those previously discussed in reference to FIGS. 4A, 4B, and 4C. Accordingly, differences in the assemblies are discussed in reference to FIGS. 9 and 10 for clarity.

As shown, the primary differences introduced in FIGS. 9 and 10 relate to a housing 160 configured to receive the second substrate 20b in an assembly feature 162. As previously discussed in reference to the housing 86, the housing 160 is configured to connect the display device 48 to the first substrate 20a and the second substrate 20b. The housing 160 also aligns the display surface 114 with the transparent window 72 through the substrates 20. The housing 160 provides for the interior cavity 52 formed by the insulating passage 50 between the first substrate 20a and the second substrate 20b by spacing the substrates 20 with a recessed surface 164 extending along a front face 166a of the housing 160. In this configuration, an air intake may provide an air flow path 110 of environmental air extending from a bottom edge 168 to a top edge 170 of the housing 160. In this configuration, the air flow path 110 may extend from a first perimeter edge to a second opposing perimeter edge of the display surface 114 along a vertical flow path through the interior cavity 52.

A rear face 166b of the housing 160 is shown in FIG. 10. The housing 160 provides for the assembly feature 162 in the form of a receiving tab 174 and a snap-fit connector 176. The receiving tab 174 is designed to position a depth of the second substrate 20b relative to the first substrate 20a along a first perimeter edge 178. Once the first perimeter edge 178 is secured to the receiving tab 174 of the housing 160, a second perimeter edge 180 of the second substrate 20b forms a snap-fit connection with the snap-fit connector 176. The connection of the snap-fit connector 176 and the receiving tab 174 to the first and second perimeter edges 178, 180 of the second substrate 20b provide for horizontal and vertical alignment of the second substrate 20b and the perimeter mask 100 within the transparent window 172 and also secure the second substrate 20b in the space-apart parallel configuration with the first substrate 20a. Accordingly, the housing 160 provides for a simplified assembly operation of the second substrate 20b, which may help to assure the alignment of the perimeter mask 100 with the display perimeter 120 and the transparent window 172 of the display apparatus 12.

According to some aspects of the disclosure, a display apparatus in connection with an interface console of a cooking appliance comprises a first substrate. The first substrate forms an interface surface of the interface console, which is exposed to a heat source of the cooking appliance. The first substrate also includes an interior surface, opposite the interface surface. A display device is configured to transmit light through the first substrate. The display device is aligned with the first substrate in a spaced-apart configuration forming an insulating passage with an interior cavity between the display device and the interior surface. An air intake is in connection with the insulating passage. The interior cavity provides an air flow path extending from an inlet positioned away from the heat source and draws environmental air from the inlet and through the insulating passage.

The display apparatus may include various additional features in any combination. Accordingly, the following features may be implemented independently unless expressly stated otherwise. In some aspects, the display is positioned in an elevated position relative to the heat source. The interior cavity may extend from a first perimeter edge of the display device to a second perimeter edge of the display device opposite the first perimeter edge. The air intake may be in connection with the insulating passage proximate to the first perimeter edge. An outlet vent may be in connection with the interior insulating passage proximate to the second perimeter edge. The first substrate may include a low-E coating disposed on the interior surface. A second substrate may be positioned between a display surface of the display device and the interior cavity configured to transmit the light from the display device. The second substrate may include a first surface directed toward the display device and a second surface directed toward the cavity. The display apparatus may include a perimeter mask disposed on the second surface of the second substrate. The perimeter mask can be implemented as a printed ceramic mask, an ink printed mask, an adhered or laminated mask layer, a thin film opaque coating, or various coatings. The first substrate may form a transparent window aligned with the display device and an opaque boundary extending about a viewing perimeter of the transparent window. The color of the perimeter mask may be configured to match the color of the opaque boundary. A user interface may be in connection with the interior surface of the first substrate. The user interface can include an electronic touch panel configured to detect a user input received on the interface surface. The interior cavity formed by the insulating passage may extend coextensive with a perimeter of the display surface. An air displacement device may generate an air flow of the environmental air through the interior cavity. The air displacement device may be in connection with the inlet of the air intake and force the air flow through the air intake and the interior cavity. The air intake may receive the environmental air from the inlet positioned below the source.

According to another aspect of the disclosure, a display apparatus is in connection with an interface console of a cooking appliance. The display apparatus includes a first substrate forming an interface surface of the interface console exposed to a heat source of the cooking appliance and an interior surface opposite the interface surface. A second substrate includes a first surface and a second surface. The second substrate is positioned spaced-apart from the first substrate forming an insulating passage with an interior cavity between the first surface and the interior surface. A display device is adjacent to the second surface of the second substrate. The first substrate and the second substrate form a transparent window aligned with the display device. An opaque boundary extends about a viewing perimeter of the transparent window on the first substrate. A perimeter mask is disposed on the second surface of the second substrate.

The display apparatus may include various additional features in any combination. Accordingly, the following features may be implemented independently unless expressly stated otherwise. A color of the perimeter mask may match the color of the opaque boundary. An air intake may be in connection with the insulating passage. The interior cavity may provide an air flow path extending from an inlet of the air intake in connection with an environmental air supply positioned away from the heat source.

In yet another aspect, the disclosure provides for a display apparatus positioned in an elevated position relative to a heat source of a cooking appliance. The display apparatus is in connection with an interface console of the cooking appliance. The interface console includes a first substrate forming an interface surface of the interface console exposed to the heat source of the cooking appliance and an interior surface opposite the interface surface. A second substrate forms a first surface and a second surface parallel to the interface surface. The second substrate is positioned spaced-apart from the first substrate forming an insulating passage with an interior cavity between the first surface and the interior surface. A display device is positioned adjacent to the second surface of the second substrate. The first substrate and the second substrate form a transparent window aligned with the display device. The interior cavity extends from a first perimeter edge of the display device to a second perimeter edge of the display device, opposite the first perimeter edge. An air intake forms an inlet in connection with the insulating passage proximate to the first perimeter edge. The interior cavity provides an air flow path extending from an inlet positioned away from the heat source that draws environmental air from the inlet and through the insulating passage. An air displacement device is in connection with the inlet of the air intake. The air displacement device generates an air flow of the environmental air through the air intake and the interior cavity.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance comprising:
   a heating surface;
   an interface console elevated above the heating surface and comprising:
      a viewing window forming an outer surface and an inner surface, opposite the outer surface; and
      a display device configured to transmit light through the viewing window, wherein the display device is aligned with the viewing window in a spaced-apart configuration forming an insulating passage between the display device and the interior surface; and
   an air intake in connection with the insulating passage, wherein the insulating passage provides an air flow path extending from a ventilation passage of the cooking appliance and the ventilation passage extends away from the heating surface and communicates environmental air to the insulating passage.

2. The cooking appliance according to claim 1, wherein the ventilation passage extends below the heating surface and communicates the environmental air upward to the insulating passage.

3. The cooking appliance according to claim 1, wherein the ventilation passage communicates the environmental air from behind the cooking appliance to the insulating passage.

4. The cooking appliance according to claim 1, wherein the insulating passage extends from a first perimeter edge of the display device to a second perimeter edge of the display device opposite the first perimeter edge.

5. The cooking appliance according to claim 4, wherein the air intake is in connection with the insulating passage proximate to the first perimeter edge.

6. The cooking appliance according to claim 4, further comprising an outlet vent in connection with the insulating passage proximate to the second perimeter edge.

7. The cooking appliance according to claim 1, wherein the substrate comprises a low-E coating disposed on the inner surface.

8. The cooking appliance according to claim 1, further comprising:
   a display substrate positioned between a display surface of the display device and the insulating passage, the display substrate configured to transmit the light from the display device.

9. The cooking appliance according to claim 8, wherein the display substrate comprises a perimeter mask extending about the display surface through which the light is transmitted from the display device.

10. The cooking appliance according to claim 9, wherein the display substrate comprises a first surface directed toward the display device and a second surface directed toward the interior cavity, and the perimeter mask is disposed on the second surface of the display substrate.

11. The cooking appliance according to claim 9, wherein the perimeter mask is a printed ceramic mask.

12. The cooking appliance according to claim 9, wherein the viewing window is aligned with the display device and an opaque boundary extends about a viewing perimeter of the viewing window.

13. The cooking appliance according to claim 12, wherein a color of the perimeter mask matches the color of the opaque boundary.

14. The cooking appliance according to claim 1, further comprising:
   a user interface in connection with the inner surface of the viewing window, wherein the user interface comprises an electronic touch panel configured to detect a user input received on the interface surface.

15. The cooking appliance according to claim 1, further comprising:
   an air displacement device that generates an air flow of the environmental air through the ventilation passage.

16. The cooking appliance according to claim 15, wherein the air displacement device is in fluid communication with the inlet of the air intake and forces the air flow through the air intake and the interior cavity.

17. A cooking appliance comprising a heating source positioned below a heating surface, the cooking appliance comprising:
   a console proximate to the heating surface that receives heat energy generated by the heating source, the console comprising:
      a viewing window forming an outer window surface and an inner window surface; and
      a display screen aligned with and spaced away from the viewing window forming a cavity therebetween, the display screen comprising an inner display surface and an outer display surface; and
   an air intake in fluid communication with the cavity, wherein the cavity provides an air flow path extending from a ventilation passage of the cooking appliance that extends away from the heating surface and communicates environmental air to the cavity.

18. The cooking appliance according to claim 17, wherein the console further comprises:
   an opaque boundary extending about a viewing perimeter of the viewing window; and
   a perimeter mask disposed on the display screen.

19. The cooking appliance according to claim 18, wherein a color of the perimeter mask matches the color of the opaque boundary.

20. A cooking appliance comprising:
   a heating surface extending over a heat generating unit;
   an interface console proximate the heating surface and comprising:
      a viewing window forming an outer surface and an inner surface, opposite the outer surface; and
      a display device configured to transmit light through the viewing window, wherein the display device is aligned with the viewing window in a spaced-apart configuration forming an interior passage between the display device and the inner surface;
   an air intake in connection with the interior passage, wherein the interior passage provides an air flow path extending from a ventilation passage of the cooking appliance; and
   an air displacement device in fluid communication with the ventilation passage, wherein the air displacement device generates an air flow of environmental air through the air intake and the interior passage.

* * * * *